United States Patent Office 3,370,649
Patented Feb. 27, 1968

3,370,649
WATER-FLOODING PROCESS
Larry G. Wolgemuth, Fullerton, Calif., assignor to Union Oil Company of California, Los Angeles, Calif., a corporation of California
No Drawing. Filed Oct. 19, 1965, Ser. No. 498,095
5 Claims. (Cl. 166—9)

ABSTRACT OF THE DISCLOSURE

The invention comprises the use of partially hydrolyzed polyacrylamide as an additive to water employed in flooding of subterranean oil-bearing reservoirs. The invention comprises the use of polyacrylamide polymerized and partially hydrolyzed in the presence of an alkali metal polyphosphate. The alkali metal polyphosphate provides the necessary alkaline conditions for partial hydrolysis of the polymer as well as serve as complexing agents for any trace of metallic impurities present in the aqueous solution. Polymers produced in this manner impart greater oil recoverability to flood waters than attained by use of polyacrylamide solutions polymerized and hydrolyzed according to the prior art. The preferred technique comprises the continuous polymerization of the polymer at the well site and injection of the polymer solution into the subterranean oil-bearing reservoir.

---

This invention relates to a method for the recovery of oil from subterranean oil-bearing formations by flooding of the formation with an aqueous medium and in particular relates to an improved method for the water flooding of such subterranean reservoir with an aqueous solution of a polyacrylamide polymer formed and partially hydrolyzed in aqueous solution and then the solution is dried The use of aqueous solutions of partially hydrolyzed polyacrylamide have found increasing acceptance in the water flooding of subterranean oil-bearing reservoirs for the displacement of oil contained therein. In this method, disclosed in Patents 2,827,964 and 3,039,529, the aqueous solution of the polymer is injected into the oil-bearing reservoir through an injection well and forced towards a withdrawal well, sweeping the oil from the reservoir towards this withdrawal well. The polymer is conventionally prepared by an aqueous polymerization process, hydrolyzed in aqueous solution and then the solution is dried to separate a powdered solid which is shipped to the injection site. At the injection site the polymer is dissolved in an aqueous solution, typically oil field brine, and then injected into the reservoir. The conventional steps of drying the crude polymerizate to separate the polymer and thereafter dissolving the polymer in another aqueous solution at the site are necessary in this conventional practice which performs the polymerization at a location removed from the oil injection site.

The hydrolysis of the polymer is commonly achieved by prolonged exposure of an aqueous solution of the polymer to elevated temperatures and raised pH in the presence of alkali metal hydroxides or carbonates such as are disclosed in Patent 3,022,279. When alkali metal carbonates are used as suggested in this patent, the carbonate salts remain in the dried polymer and are dissolved in the injection water at the well site. The presence of the carbonate salts is not advantageous in the process since the carbonates lower the solubility of calcium cations commonly found in oil field reservoirs and oil field brines and in addition the carbonates contribute to the total electrolyte concentration of the solution, ending to decrease its viscosity by diffusing the localized ionic charge on the carboxylic acids of the polymer which otherwise retain the polymer in an uncoiled and viscous condition.

It is an object of this invention to provide an improved oil recovery process using partially hydrolyzed polyacrylamide polymers.

It is a further object of this invention to provide an improved polymeriztaion and polymer hydrolysis method for the preparation of a partially hydrolyzed polyacrylamide useful in water flooding of subterranean oil reservoirs.

It is an additional object of this invention to eliminate the unnecessary steps presently employed in the preparation and use of the polymer for water flooding.

Other and related objects will be apparent from the following description of the invention.

I have now found that the first of the aforementioned objects can be achieved by the addition of an alkali metal polyphosphate salt to the aqueous solution of partially hydrolyzed polyacrylamide. This addition of polyphosphate measurably increases oil recovery from oil bearing sands.

I have also found that the aforementioned objects can be achieved in a simple manner by the polymerization of the acrylamide and hydrolysis of the resultant polymer in the presence of an alkali metal polyphosphate and in a continuous process which can be practiced at the well site. The resultant solution of partially hydrolyzed polyacrylamide can thereafter be admixed with additional quantities of water to provide the desired concentration of polymer for the water flooding operation. This solution is injected directly into the well site and the steps of drying the polymer and subsequent dissolving of the dried powder are eliminated. The polyphosphate salts desirably serve a plurality of functions in the polymerization process as well as in the water flooding of the subterranean reservoir.

The polymerization of acrylamide proceeds by a free radical mechanism and the presence of metallic cation such as iron and copper, even in trace impurity concentrations, inhibit this polymerization and reduce the molecular weight of the polymer and hence its effectiveness in water flooding. The presence of the polyphosphates, however, eliminates this inhibition, presumably by effecting stable complexes with the metallic cations, thereby removing them from interference in the free radical polymerization. The polyphosphates however also function as catalysts or pH control agents to effect the simultaneous hydrolysis of the polymer with the polymerization of the monomer. Thus I have found that the polyphosphates alone are effective in preventing trace metal inhibition of the polymerization and also effective in hydrolyzing the polymer to the desired partially hydrolyzed state.

The polyphosphates, however, also have a very desired influence on the water-flooding process since these salts exhibit a marked increase in the injectability of the aqueous solution into the reservoir, thereby reducing the injection pressure and power requirements for the water-flooding process. The polyphosphates serve as reverse wetting agents, i.e., change the reservoir from an oil-wet to a water-wet condition, thereby improving the sweep efficiency of the water flood.

The combined polymerization and hydrolysis of the polymer is preferably employed at the well site in available aqueous media and the resultant product is thereafter admixed with water to achieve the desired concentration of the polymer and the polymer solution is then injected into the well site. My process thus comprises a method for recovering petroleum from a subterranean oil-bearing formation by forming a homogeneous aqueous solution containing at least about 5 weight percent acrylamide and an alkali metal polyphosphate in an amount from about 0.05 to about 2.5 mols per mol of acrylamide in the reaction mixture, admixing with the solution a catalyst for the polymerization of vinyl monomers and initiating the polymerization at a temperature from about 25° to about 80° C. and retaining the solution at said temperature for a period of time sufficient to effect hydrolysis of from 5 to about 70, preferably from about 15 to 60, percent of the amide groups to carboxylic acid groups. Thereafter the solution of the partially hydrolyzed polyacrylamide is admixed with water to obtain an aqueous solution having a concentration of from 0.005 to about 2.0, preferably from about 0.01 to 1.0, weight percent of the polymer and the admixed solutions are introduced into an input well penetrating the subterranean oil well formation and forced by the continued injection of an aqueous medium into said input well through said formation towards at least another output well also penetrating said formation at a distance removed from said input well. The displaced reservoir fluids are withdrawn from said other output well.

The polymer useful in the invention comprises a partially hydrolyzed polyacrylamide which is obtained by the polymerization, preferably homopolymerization, of acrylamide. If desired, however, up to about 10 weight percent of other vinyl monomers such as vinyl acetate, acrylonitrile, methacrylonitrile, vinyl alkyl ethers, vinyl chloride and the like, can be employed provided that the copolymers so obtained are characterized by water solubility and freedom from crosslinking. The acrylamide is polymerized by any suitable vinyl polymerization initiator, e.g., free radical forming compounds such as the azo compounds, e.g., azobisisobutyranitrile, azobisisobutyramidine chloride, etc.; peroxides such as hydrogen peroxide, sodium peroxide, benzoyl peroxide; alkyl peroxides such as t-butyl hydrogen peroxides; and dialkyl peroxides such as diethyl peroxide, di-t-butyl peroxide, etc.; alkali metal persulfates, etc. These polymers are characterized by high molecular weight, e.g., 500,000 to about 15,000,000; preferably from 1,000,000 to about 5,000,000 and for use in my invention are partially hydrolyzed so that from 5 to about 70 percent of the amide groups of the polymer are hydrolyzed to carboxylic acid or caboxylate groups. While the hydrolysis can be performed in a step separate from the polymerization of the monomer, it is preferred to employ a simultaneous polymerization and hydrolysis step.

The alkali metal polyphosphate salts serve a dual function in the latter technique since the polyphosphates serve as complexing agents for any trace metallic impurities that may be present in the aqueous solution as well as supply the alkalinity for hydrolysis of the amide groups. In this manner extensive purification of the aqueous medium employed for the polymerization need not be practiced but instead the polymerization can be performed in available potable waters or brines at the well site. The polyphosphates when present in a concentration from about 0.05 to about 2.5 mols per mol of the aforementioned acrylamide monomer also serve as alkalizing agents to permit the hydrolysis of the polymer and thereby obtain the partially hydrolyzed product necessary for the water-flooding operation.

Examples of suitable alkali metal polyphosphates for this process include the pyrophosphate salts, e.g., tetrasodium pyrophosphate, tetrapotassium pyrophosphate, lithium sodium pyrophosphate, etc.; the tripolyphosphates, e.g., pentasodium tripolyphosphate, tetrasodium hydrogen tripolyphosphate, lithium dihydrogen tripolyphosphate, etc.; the tetrapolyphosphates, e.g., heptasodium tetrapolyphosphate, sodium dihydrogen tetrapolyphosphate, potassium dihydrogen tetrapolyphosphate, etc. Examples of the commonly available high condensed alkali metal polyphosphates can also be used such as the water soluble Maddrell's salt, Kurrol's salt, etc. The various cyclic polyphosphates can also be used such as the metaphosphates, e.g., sodium hexametaphosphate, trisodium trimetaphosphate, tetrasodium magnesium trimetaphosphate, sodium barium trimetaphosphate, sodium tetrametaphosphate, potassium tetrametaphosphate, etc.

In general, the acyclic polyphosphate salts are characterized by the following structure:

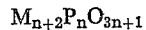

The metaphosphates are characterized by the following structure:

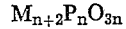

wherein:

M is an alkali metal; and $n$ is a whole number greater than 1.

To effect the polymerization and simultaneous hydrolysis of the polymer, the acrylamide is dissolved in the water at a concentration from about 5 weight percent to the limit of its solubility; preferably from about 10 to about 15 weight percent. The polyphosphate salt is thereafter added at a concentration from about 0.05 to about 2.5 mols per mol of acrylamide monomer; preferably from about 0.30 to about 0.50 mols per mol. The solution is thereafter admixed with the aqueous solution of the polymerization initiator which can be any of the aforementioned free radical generators. The polymerization is maintained at a temperature from about 25° to about 80° C., preferably from about 45° to about 60° C. by performing the polymerization in a reactor having suitable heat exchange means to remove the exothermic heat of polymerization therefrom. The polymerization is relatively rapid and high molecular weight polymers are produced under the aforementioned conditions. The resultant solution is maintained at the aforementioned temperatures for an extended period of time, generally from about 5 to about 20 hours, preferably from about 8 to about 12 hours to effect hydrolysis of up to about 70 percent of the amide groups in the polymer. This hydrolysis is occasioned by the liberation of ammonia from the solution and the formation of carboxylic acid sites along the polymer chain.

The resultant solution contains a partially hydrolyzed polymer at a concentration of from about 5 to about 20 weight percent. To this solution is thereafter admixed a sufficient quantity of available water, e.g., potable water or oil field brine to reduce the concentration of this polymer to about 0.005 to about 1.5 weight percent. At this concentration the polymer will exhibit a viscosity of from 2 to about 1000 centipoises and is highly effective in the displacement of oil from subterranean oil-bearing reservoirs. Preferably the concentration is adjusted to provide a solution having from about 5 to 100 centipoises. The water can simply be admixed by introduction into the polymer solution through a pipe mixer or by any other available mixing technique. The admixed solutions are then ready for injection into the input well of the subterranean reservoir and an injection pump is used to pressure the solutions to the necessary pressure for this injection and thereby force the fluids into the reservoir.

In carrying out the subterranean displacement process, the conventional water flooding procedures can be employed. The injection and production wells can be suitably fitted with packers if required and the viscous flooding medium forced down the injection well and out into the reservoir by means of conventional pumping equipment located at the well head. In the interests of economy it is preferred to employ the viscous flooding medium to form a flooding front and to follow the viscous medium with ordinary flooding water. Accordingly, after from about 0.5 to about 50, preferably from 5 to about 25, percent of the pore volume to be displaced has been injected as an aqueous medium, the polymerization is discontinued and thereafter the available water is directly injected to force the aqueous medium through the reservoir to the production well. This amount of injection will be sufficient to insure adequate separation of the ordinary flooding water and the more viscous subterranean reservoir oil. If desired, the concentration of the polymer can be stated and gradually decreased by progressively increasing the amount of ordinary water admixed with the polymer solution at the injection site so that a gradual or continuous diminishing of the viscosity of the injected water can be achieved in the flooding front from its maximum viscosity at the oil interface to the viscosity of water at the injection site.

The following examples will illustrate the practice of my invention:

EXAMPLE 1

*Polymer Solution A*

A solution of partially hydrolyzed polyacrylamide was prepared in a 3-liter, 3-necked round bottom flask equipped with a condenser, a thermometer, a gas dispersion dip tube and a mechanical stirrer. To the flask was added 1011 milliliters distilled water, 150 grams sodium tripolyphosphate and 141 grams acrylamide. Nitrogen was passed through the solution for 3 hours and thereafter 45 milliliters of a 1 percent solution of potassium persulfate was added. The reactants were heated to and maintained at 45° C. for 12 hours under nitrogen atmosphere. The reactants were cooled to room temperature and a portion of the reactants were dissolved in water to provide a solution containing 0.01 weight percent of the polymer. This solution had a viscosity of 7.4 centipoises at 3 r.p.m. at 25° C. on a Brookfield viscosimeter and is hereafter identified as Polymer Solution A.

*Polymer Solution B*

A commercially available polyacrylamide having a molecular weight between 10 and 12 million was hydrolyzed with sodium carbonate in the following experiment to prepare a material representative of a partially hydrolyzed polymer containing sodium carbonate which is commonly used in water flooding operations. The hydrolysis of the polymer was achieved by adding 250 milliliters distilled water to a 500 milliliter, 3-necked, round bottom flask equipped with a condenser and 12.5 grams of a polymer with 2.0 grams sodium carbonate. The reaction mixture was heated for 20 hours at 65° C. to achieve the desired extent of hydrolysis. Thereafter the reactants were cooled to room temperature and used in the following experiments. A solution containing 0.01 weight percent of the aforementioned partially hydrolyzed polyacrylamide had a viscosity of 14.0 cps. at 3 r.p.m. and 25° C. on the Brookfield viscosimeter. This polymer solution is hereafter identified as Polymer Solution B.

*Polymer Solution C*

A commercially available polyacrylamide having a molecular weight between 10 and 12 million was hydrolyzed with sodium polyphosphate by adding 250 milliliters water, 12.5 grams of the polymer and 2.0 grams sodium tripolyphosphate to a flask. The reaction mixture was heated to 65° C. and maintained at that temperature for 20 hours. Sufficient water was added to a portion of the polymer solution to prepare an aqueous solution having a polymer concentration of 0.01 weight percent. This solution had a viscosity of 8.0 centipoises at 3 r.p.m. on the Brookfield viscosimeter and is herein identified as Solution C.

*Polymer Solution D*

A commercially available partially hydrolyzed polyacrylamide which had between 20 and 30 percent of its amide groups hydrolyzed to carboxylic acid groups and which had been polymerized in the presence of sodium carbonate using a weight ratio of acrylamide monomer to sodium carbonate of about 4/1 was dissolved in water to prepare a solution containing 0.01 weight percent of the polymer. This solution had a viscosity of 15.2 centipoises at 3 r.p.m. on the Brookfield viscosimeter and is herein identified as Solution D.

*Polymer Solution E*

To a separate portion of Polymer Solution D was added sodium tripolyphosphate at a concentration of 0.01 weight percent. This solution had a viscosity of 6.6 centipoises at 3 r.p.m. on the Brookfield viscosimeter and is herein identified as Solution E.

EXAMPLE 2

The aforementioned polymers prepared in Example 1 were employed in comparative testing for the oil displacement from synthetic sandstone cores. The sand cores were consolidated Ohio sandstone of ¾-inch diameter and 1-inch length with a pore volume of about 1.7 milliliters. The cores were supported in a plastic core holder having flange faces equipped with injection and withdrawal ports. Provision was made to supply the fluids to the core at a pressure of about 5 p.s.i.g. Prior to use, the synthetic cores were acid extracted with 6 N hydrochloric acid and then calcined in an oven at 1500° F. for 12 hours. The cores were then prepared for use in the test procedure by saturation of these cores with an oil field brine containing 3.0 weight percent dissolved salts. In each of the aqueous solutions under evaluation the following procedure was employed:

(1) The core was staturated with the brine solution;

(2) The brine-saturated core was saturated with oil by flooding it with a hydrocarbon oil having a viscosity of 33.3 cps. at 25° C. The amount of oil in the saturated core was recorded;

(3) The oil-saturated core was then flooded by the injection of a brine solution containing 3 percent dissolved salts. The pressure of injection was maintained at 5 p.s.i.g. and the rate of injection of the fluid in milliliters per minute was recorded as $M_V$. This injection was continued and the displaced fluids were sampled periodically to determine the amount of oil displaced from the reservoir at any given injection of the brine solution.

(4) The core was then restored to an oil saturated state by the injection of oil to displace the brine therefrom. The rate of injection of the oil under 5 p.s.i.g. pressure was measured and this was recorded as $M_O$. The total volume of oil so injected was recorded.

(5) Thereafter the aqueous solution of the polymer under investigation was injected to the core and the rate of injection of the solution at 5 p.s.i.g. in milliliters per minute was recorded as $M_P$. The volume of oil displaced from the reservoir was measured periodically and recorded as a function of the amount of injected polymer solution. After the oil was no longer displaced from the core, the injection was stopped.

(6) The polymer displaced core was then restored by the injection of the oil at 5 p.s.i.g. and the rate of injection of the oil was recorded as $M_{O-1}$.

To evaluate the recovery of oil from the core as a function of the polymer so injected, the amount of oil recovered after 1.5 pore volumes of the solution had been injected when displacing with the polymer and brine solutions was subtracted from the total amount of oil injected when saturating the core to determine the amount of oil remaining in the core. The resultant amount was divided by the pore volume to determine the residual oil as a percent of the pore volume of the core. This calculation was made for each of the polymer and brine floods and the results are reported in the table. The incremental increase from the polymer solutions was determined by subtracting the residual oil after the polymer flood from the residual oil after the brine flood to indicate the incremental recovery when displacing with the polymer solution and these results are reported as $\Delta S_O$ in the table. Since substantially all the displaceable oil has been removed after the amount of aqueous solution injected corresponds to approximately 1.5 times the pore volume of the sandstone core, the evaluation of the total oil recovered was determined at this quantity of injected solution.

To evaluate the degree of plugging, i.e., occlusion of the polymer within the sandstone pores, resistivity factors were calculated. The polymer resistance factor ($R_P$) was obtained by dividing the mobility of the brine solution, $M_v$, by the mobility of the polymer solution $M_P$, and an oil resistivity ($R_O$) determination was calculated by dividing the mobility of the oil after the brine flood, $M_O$, by the mobility of the oil in the core after the polymer flood, $M_{O-1}$. Ideally, the latter resistivity factor should approach 1, thereby indicating relative inertness of the polymer to the sandstone core. It is also preferred that the resistivity factor of the polymer solution be relatively high to indicate that the core is less permeable to this polymer solution and hence that the polymer is effective in distributing the flooding front throughout the sandstone core.

TABLE 1

| Polymer Solution | Weight Percent Polyphosphate | Viscosity | $\Delta S_o$ | Residual Oil | $R_P$ | $R_O$ | Polymer Description |
|---|---|---|---|---|---|---|---|
| A* | 0.01 | 7.4 | 5.8 | 27.2 | 6.3 | 3.5 | Polymerized and hydrolyzed with polyphosphate. |
| Brine | | 1.0 | | 33.0 | | | |
| B* | | 14.0 | 4.3 | 29.8 | 5.5 | 4.6 | High molecular weight polymer hydrolyzed with carbonate. |
| Brine | | 1.0 | | 34.1 | | | |
| C* | 0.002 | 8.0 | 6.0 | 29.0 | 3.9 | 2.7 | High molecular weight polymer hydrolyzed with polyphosphate. |
| Brine | | 1.0 | | 33.0 | | | |
| D* | | 15.2 | 5.6 | 26.3 | 4.9 | 3.5 | Polymerized and hydrolyzed with carbonate. |
| Brine | | 1.0 | | 31.9 | | | |
| E* | 0.01 | 6.6 | 5.8 | 32.2 | 3.6 | 3.7 | Polymer D and polyphosphate. |
| Brine | | 1.0 | | 38.0 | | | |

*All polymer solutions at 0.01 weight percent concentration. All polymers having about 20–30 percent partially hydrolyzed.

The preceding data indicate that the polyphosphate salt when incorporated in the polymer solutions in all cases enhanced the oil recovery. This is evident from a comparison of the $\Delta S_O$ values reported, e.g., Solution C which repeated Solution B except for substitution of the polyphosphate for the carbonate provided an increase from 4.3 to 6.0 percent greater oil recovery than brine alone. Similarly, the addition of a polyphosphate to the commercial partially hydrolyzed polyacrylamide improved the recovery from 5.6 to 5.8 percent over that of brine alone.

The data also indicate that the polymer polymerized and hydrolyzed in the presence of a polyphosphate has a greater resistivity factor, i.e., the aqueous solution of Polymer A was less mobile in the reservoir than all other polymer solutions investigated. Both polymers, however, were less mobile in the reservoir than brine alone. Finally, the data also indicate that the polymer prepared with hydrolysis by a polyphosphate salt resulted in a significantly lower decreased permeability of the reservoir sands to oil in that the $R_O$ factor was 3.5 as opposed to 4.6 with the polymer hydrolyzed by sodium carbonate.

The preceding examples are intended solely to illustrate a mode of practice of the invention and are not to be construed as unduly limiting thereof. It is apparent that obvious changes and modifications can be made from the illustrated mode of practice without departing from the scope of the invention which is intended to be defined by the steps and their obvious equivalents set forth in the following claims.

I claim:
1. The method for recovering petroleum from a subterranean oil-bearing formation that comprises forming a homogeneous aqueous solution containing from about 5 to about 15 weight percent acrylamide and an alkali metal polyphosphate in an amount from about 0.05 to about 2.5 mols per mol of said acrylamide, admixing with the solution a free radical generating catalyst for the polymerization of vinyl monomers and initiating polymerization at a temperature from about 25° to about 80° C. and retaining the solution at said temperature for a period of time sufficient to effect hydrolysis of from 5 to about 70 percent of the amide groups to carboxylic acid groups, thereafter admixing the resultant solution of partially hydrolyzed polyacrylamide with water to obtain an aqueous medium having a concentration from about 0.005 to about 1.5 weight percent of said polymer, injecting the aqueous medium into an input well penetrating a subterranean oil well formation and forcing said medium through said formation towards at least one other input well also penetrating said formation at a distance removed from said input well by the continued injection of an aqueous medium into said input well while withdrawing displaced reservoir fluids from said other output well.

2. The method of claim 1 wherein the injection of said solution into said reservoir is ceased after from 0.5 to about 50 percent of the pore volume to be swept by said solution has been injected and thereafter water is injected as said aqueous medium to force said solution to said output well.

3. The method of claim 1 wherein the concentration of said partially hydrolyzed polyacrylamide is gradually decreased after the injection of from 5 to 25 percent of the pore volume has been injected and until said aqueous medium is essentially free of said polymer.

4. The method of claim 1 wherein said solution is retained at said temperature for a sufficient time to hydrolyze from 15 to about 60 percent of the amide groups to carboxylic acid groups.

5. The method of claim 1 wherein said water is oil field brine.

References Cited
UNITED STATES PATENTS

| 2,827,964 | 3/1958 | Sandiford | 166—9 |
| 3,039,529 | 6/1962 | McKennon | 166—9 |
| 3,191,676 | 6/1965 | Froning | 166—9 |
| 3,258,071 | 6/1966 | Yu Shen | 166—9 |

JAMES A. LEPPINK, *Primary Examiner.*

UNITED STATES PATENT OFFICE
CERTIFICATE OF CORRECTION

Patent No. 3,370,649            February 27, 1968

Larry G. Wolgemuth

It is hereby certified that error appears in the above numbered patent requiring correction and that the said Letters Patent should read as corrected below.

Column 8, line 34, for "input" read -- output --.

Signed and sealed this 29th day of April 1969.

SEAL)
Attest:

Edward M. Fletcher, Jr.            EDWARD J. BRENNER
Attesting Officer            Commissioner of Patents